(12) United States Patent
Isaacson et al.

(10) Patent No.: US 10,846,725 B2
(45) Date of Patent: Nov. 24, 2020

(54) METHOD FOR RULE-BASED GIFT GIVING

(71) Applicant: GiftYa LLC, Pittsburgh, PA (US)

(72) Inventors: Thomas M. Isaacson, Huntingtown, MD (US); Ryan C. Durham, Dunkirk, MD (US); Adam Ludwig, San Francisco, CA (US); Patrick Ledbetter, Arlington, VA (US)

(73) Assignee: GIFTYA LLC, Pittsburgh, PA (US)

(*) Notice: Subject to any disclaimer, the term of this patent is extended or adjusted under 35 U.S.C. 154(b) by 535 days.

(21) Appl. No.: 15/650,215

(22) Filed: Jul. 14, 2017

(65) Prior Publication Data

US 2017/0316440 A1    Nov. 2, 2017

Related U.S. Application Data

(63) Continuation of application No. 14/278,628, filed on May 15, 2014, now abandoned, which is a
(Continued)

(51) Int. Cl.
*G06Q 30/00* (2012.01)
*G06Q 30/02* (2012.01)
(Continued)

(52) U.S. Cl.
CPC ......... *G06Q 30/0217* (2013.01); *G06Q 20/10* (2013.01); *G06Q 20/105* (2013.01);
(Continued)

(58) Field of Classification Search
CPC .................................................. G06Q 30/0217
(Continued)

(56) References Cited

U.S. PATENT DOCUMENTS 5,580,196 A    12/1996    Thompson
5,590,196 A    12/1996    Moreau
(Continued)

FOREIGN PATENT DOCUMENTS

GB    2376787    12/2002
JP    2002/222377    8/2002
(Continued)

OTHER PUBLICATIONS

NPL Search History.*
(Continued)

*Primary Examiner* — John H. Holly

(57) ABSTRACT

A method for rule-based gift giving method collects information about life events of one or more friends from one or more social network systems and/or from one or more online profiles. The gathered information may be organized in a news stream format or a calendar items format. The user creates rules including parameters such as monetary value of the gift, identity of the recipient and the life event on which to send the gift. The user may generate a default list of friends who will automatically receive user-selected gifts on user-selected life events. According to another embodiment, the user may generate an on-demand list of friends who will receive gifts on selected life events upon user's approval.

12 Claims, 7 Drawing Sheets

Related U.S. Application Data continuation-in-part of application No. 14/193,068, filed on Feb. 28, 2014, now Pat. No. 8,751,392, which is a continuation of application No. 12/075,655, filed on Mar. 13, 2008, now Pat. No. 8,676,704, application No. 15/650,215, which is a continuation of application No. 12/475,122, filed on May 29, 2009, now abandoned.

(60) Provisional application No. 61/057,106, filed on May 29, 2008.

(51) Int. Cl.
  *G06Q 50/00* (2012.01)
  *G06Q 20/10* (2012.01)
  *G06Q 20/24* (2012.01)
  *G06Q 40/02* (2012.01)

(52) U.S. Cl.
  CPC .............. *G06Q 20/24* (2013.01); *G06Q 40/02* (2013.01); *G06Q 50/01* (2013.01)

(58) Field of Classification Search
  USPC ...... 705/41, 1.1, 35, 12, 39, 14.32, 44, 26.1, 705/67, 64, 40; 235/380, 381
  See application file for complete search history.

(56) References Cited

U.S. PATENT DOCUMENTS

| | | |
|---|---|---|
| 5,794,219 A | 8/1998 | Brown |
| 5,848,396 A | 12/1998 | Gerace |
| 5,861,841 A | 1/1999 | Gildea et al. |
| H1794 H | 4/1999 | Claus |
| 5,963,647 A | 10/1999 | Downing et al. |
| 5,984,180 A | 11/1999 | Albrecht |
| 6,000,608 A | 12/1999 | Dorf |
| 6,014,634 A | 1/2000 | Scroggie et al. |
| 6,014,635 A | 1/2000 | Harris et al. |
| 6,044,360 A | 3/2000 | Picciallo |
| 6,068,183 A | 5/2000 | Freeman |
| 6,173,269 B1 | 1/2001 | Solokl et al. |
| 6,175,823 B1 | 1/2001 | Van Dusen |
| 6,182,895 B1 | 2/2001 | Albrecht |
| 6,189,787 B1 | 2/2001 | Dorf |
| 6,292,786 B1 | 9/2001 | Deaton et al. |
| 6,321,211 B1 | 11/2001 | Dodd |
| 6,330,543 B1 | 12/2001 | Kepecs |
| 6,370,514 B1 | 4/2002 | Messner |
| 6,408,307 B1 | 6/2002 | Semple et al. |
| 6,454,165 B1 | 9/2002 | Dawson |
| 6,484,148 B1 | 11/2002 | Boyd |
| 6,487,538 B1 | 11/2002 | Gupta et al. |
| 6,505,046 B1 | 1/2003 | Baker |
| 6,526,335 B1 | 2/2003 | Treyz et al. |
| 6,546,257 B1 | 4/2003 | Stewart |
| 6,571,279 B1 | 5/2003 | Herz et al. |
| 6,587,835 B1 | 7/2003 | Treyz et al. |
| 6,594,644 B1 | 7/2003 | Van Dusen |
| 6,601,037 B1 | 7/2003 | Kolls |
| 6,606,602 B1 | 8/2003 | Kolls |
| 6,609,106 B1 | 8/2003 | Robertson |
| 6,672,507 B1 | 1/2004 | Walker et al. |
| 6,711,474 B1 | 3/2004 | Treyz et al. |
| 6,775,539 B2 | 8/2004 | Deshpande |
| 6,795,710 B1 | 9/2004 | Creemer |
| 6,805,289 B2 | 10/2004 | Noriega et al. |
| 6,865,546 B1 | 3/2005 | Song |
| 6,889,054 B2 | 5/2005 | Himmel et al. |
| 6,947,976 B1 | 9/2005 | Devitt et al. |
| 6,970,871 B1 | 11/2005 | Rayburn |
| 7,010,512 B1 | 3/2006 | Gillin et al. |
| 7,021,531 B2 | 4/2006 | Myttenaere |
| 7,039,601 B2 | 5/2006 | Gary |
| 7,089,208 B1 | 8/2006 | Levchin et al. |
| 7,127,236 B2 | 10/2006 | Khan et al. |
| 7,165,049 B2 | 1/2007 | Slater |
| 7,200,566 B1 | 4/2007 | Moore et al. |
| 7,204,412 B2 | 4/2007 | Foss, Jr. |
| 7,213,027 B1 | 5/2007 | Kominek et al. |
| 7,280,984 B2 | 10/2007 | Phelan, III et al. |
| 7,357,331 B2 | 4/2008 | Blossom |
| 7,512,552 B2 | 3/2009 | Karas et al. |
| 7,559,465 B2 | 7/2009 | Rosenblatt |
| 7,593,862 B2 | 9/2009 | Mankoff |
| 7,603,292 B1 | 10/2009 | Bragg et al. |
| 7,698,221 B2 | 4/2010 | Blinn et al. |
| 7,792,751 B2 | 9/2010 | Tan |
| 7,831,439 B1 | 11/2010 | Bryar |
| 7,860,789 B2 | 12/2010 | Hirka et al. |
| 7,861,919 B2 | 1/2011 | Spaeth et al. |
| 7,870,022 B2 | 1/2011 | Bous et al. |
| 7,873,573 B2 | 1/2011 | Realini |
| 8,046,266 B1 | 10/2011 | Geller et al. |
| 8,112,315 B2 | 2/2012 | Dooley et al. |
| 8,473,380 B2 * | 6/2013 | Thomas ................ G06Q 40/00 705/35 |
| 8,577,735 B2 | 11/2013 | Wilen et al. |
| 8,639,629 B1 | 1/2014 | Hoffman |
| 2001/0054066 A1 | 12/2001 | Spitzer |
| 2002/0035605 A1 | 3/2002 | McDowell et al. |
| 2002/0040438 A1 | 4/2002 | Fisher, Jr. |
| 2002/0046341 A1 | 4/2002 | Kazaks et al. |
| 2002/0062246 A1 | 5/2002 | Matsubara |
| 2002/0174016 A1 | 11/2002 | Cuervo |
| 2003/0028515 A1 | 2/2003 | Nishikado et al. |
| 2003/0028518 A1 | 2/2003 | Mankoff |
| 2003/0040959 A1 | 2/2003 | Fei et al. |
| 2003/0083941 A1 | 5/2003 | Moran et al. |
| 2003/0130907 A1 | 7/2003 | Karas et al. |
| 2003/0171997 A1 | 9/2003 | Eaton |
| 2003/0182191 A1 | 9/2003 | Oliver et al. |
| 2003/0216960 A1 | 11/2003 | Postrel |
| 2004/0002897 A1 | 1/2004 | Vishik |
| 2004/0073482 A1 | 4/2004 | Wiggins et al. |
| 2004/0078283 A1 | 4/2004 | Gary |
| 2004/0089714 A1 | 5/2004 | Raadsen |
| 2004/0111361 A1 | 6/2004 | Griffiths et al. |
| 2004/0148228 A1 | 7/2004 | Kwei |
| 2004/0162775 A1 | 8/2004 | Winklevoss et al. |
| 2004/0203852 A1 | 10/2004 | Janakiraman |
| 2004/0249712 A1 | 12/2004 | Brown et al. |
| 2005/0075932 A1 | 4/2005 | Mankoff |
| 2005/0092828 A1 | 5/2005 | Phillips |
| 2005/0097005 A1 | 5/2005 | Fargo |
| 2005/0108121 A1 | 5/2005 | Gravett et al. |
| 2005/0131761 A1 | 6/2005 | Trika et al. |
| 2005/0177493 A1 | 8/2005 | Sung |
| 2005/0197919 A1 | 9/2005 | Robertson |
| 2005/0199712 A1 | 9/2005 | Rosenblatt |
| 2005/0209958 A1 | 9/2005 | Michelsen et al. |
| 2005/0234771 A1 | 10/2005 | Register et al. |
| 2006/0015405 A1 | 1/2006 | Bala et al. |
| 2006/0059070 A1 | 3/2006 | Petruck |
| 2006/0074767 A1 | 4/2006 | Fortney et al. |
| 2006/0095338 A1 | 5/2006 | Seidel |
| 2006/0122856 A1 | 6/2006 | Rushton et al. |
| 2006/0178932 A1 | 8/2006 | Lang |
| 2006/0208065 A1 | 9/2006 | Mendelovich et al. |
| 2006/0229950 A1 | 10/2006 | Pabbisetty |
| 2006/0253320 A1 | 11/2006 | Heywood |
| 2006/0258397 A1 | 11/2006 | Kaplan et al. |
| 2006/0293963 A1 | 12/2006 | Hoblit |
| 2007/0012759 A1 | 1/2007 | Allarea et al. |
| 2007/0017976 A1 | 1/2007 | Peyret et al. |
| 2007/0022007 A1 | 1/2007 | Lawe |
| 2007/0050711 A1 | 3/2007 | Walker et al. |
| 2007/0063020 A1 | 3/2007 | Barrafato |
| 2007/0073589 A1 | 3/2007 | Vergeyle et al. |
| 2007/0088610 A1 | 4/2007 | Chen |
| 2007/0088801 A1 | 4/2007 | Levkovitz et al. |
| 2007/0103993 A1 | 5/2007 | Mount et al. |
| 2007/0140176 A1 | 6/2007 | Bachenberg |
| 2007/0143177 A1 | 6/2007 | Graves et al. |

(56) References Cited

U.S. PATENT DOCUMENTS

| | | |
|---|---|---|
| 2007/0158413 A1 | 7/2007 | Hastie |
| 2007/0168265 A1 | 7/2007 | Rosenberger |
| 2007/0174120 A1 | 7/2007 | Asmar et al. |
| 2007/0175984 A1 | 8/2007 | Khandaker et al. |
| 2007/0192182 A1 | 8/2007 | Monaco et al. |
| 2007/0210152 A1 | 9/2007 | Read |
| 2007/0255620 A1 | 11/2007 | Tumminaro et al. |
| 2007/0255653 A1 | 11/2007 | Tumminaro et al. |
| 2007/0264991 A1 | 11/2007 | Jones et al. |
| 2007/0270165 A1 | 11/2007 | Poosala |
| 2007/0288313 A1 | 12/2007 | Brodson et al. |
| 2008/0004888 A1 | 1/2008 | Davis et al. |
| 2008/0004984 A1 | 1/2008 | Sendo et al. |
| 2008/0010114 A1 | 1/2008 | Head |
| 2008/0010120 A1 | 1/2008 | Chung |
| 2008/0027820 A1 | 1/2008 | Brill |
| 2008/0033817 A1 | 2/2008 | Billmaier et al. |
| 2008/0033857 A1 | 2/2008 | Moses |
| 2008/0048023 A1 | 2/2008 | Russell et al. |
| 2008/0082424 A1 | 4/2008 | Walton |
| 2008/0091528 A1 | 4/2008 | Rampell et al. |
| 2008/0091535 A1 | 4/2008 | Heiser et al. |
| 2008/0097851 A1 | 4/2008 | Bemmel et al. |
| 2008/0099551 A1 | 5/2008 | Harper |
| 2008/0133257 A1 | 6/2008 | Adkisson et al. |
| 2008/0189189 A1* | 8/2008 | Morgenstern ...... G06Q 30/0641 705/12 |
| 2008/0223922 A1 | 9/2008 | Weitzman |
| 2008/0235122 A1 | 9/2008 | Weitzman |
| 2008/0243630 A1 | 10/2008 | Farney |
| 2008/0255948 A1 | 10/2008 | Garner |
| 2008/0288406 A1 | 11/2008 | Sequin et al. |
| 2008/0301005 A1 | 12/2008 | Nieda et al. |
| 2008/0301044 A1 | 12/2008 | Vardi |
| 2009/0018916 A1 | 1/2009 | Seven et al. |
| 2009/0018959 A1 | 1/2009 | Doran et al. |
| 2009/0032581 A1 | 2/2009 | Esslinger et al. |
| 2009/0048926 A1 | 2/2009 | Salesky et al. |
| 2009/0063295 A1 | 3/2009 | Smith |
| 2009/0094134 A1 | 4/2009 | Toomer et al. |
| 2009/0112709 A1 | 4/2009 | Barhydt |
| 2009/0125410 A1 | 5/2009 | Perlman |
| 2009/0132387 A1 | 5/2009 | Majdoub |
| 2009/0132415 A1 | 5/2009 | Davis et al. |
| 2009/0159698 A1 | 6/2009 | Mullen et al. |
| 2009/0171683 A1 | 7/2009 | Hoyos et al. |
| 2009/0192928 A1 | 7/2009 | Abifaker |
| 2009/0234771 A1 | 9/2009 | Ledbetter et al. |
| 2009/0271265 A1 | 10/2009 | Lay et al. |
| 2009/0287579 A1 | 11/2009 | Walker et al. |
| 2009/0307130 A1 | 12/2009 | Tan |
| 2009/0307143 A1 | 12/2009 | Reistad et al. |
| 2009/0313109 A1 | 12/2009 | Bous et al. |
| 2009/0327067 A1 | 12/2009 | Berger et al. |
| 2009/0327129 A1 | 12/2009 | Collas et al. |
| 2010/0010918 A1 | 1/2010 | Hunt |
| 2010/0017278 A1 | 1/2010 | Wilen et al. |
| 2010/0023341 A1 | 1/2010 | Ledbetter et al. |
| 2010/0023418 A1 | 1/2010 | Bader et al. |
| 2010/0036524 A1 | 2/2010 | Chirco |
| 2010/0057580 A1 | 3/2010 | Raghunathan |
| 2010/0076833 A1 | 3/2010 | Nelsen |
| 2010/0106592 A1 | 4/2010 | Brown |
| 2010/0299208 A1 | 11/2010 | Carlson et al. |
| 2010/0299227 A1 | 11/2010 | Smith |
| 2010/0299228 A1 | 11/2010 | Smith |
| 2010/0325006 A1 | 12/2010 | White |
| 2011/0004512 A1 | 1/2011 | Postrel |
| 2011/0011931 A1 | 1/2011 | Farley et al. |
| 2011/0016023 A1 | 1/2011 | Zakas |
| 2011/0106698 A1 | 5/2011 | Isaacson et al. |
| 2011/0282784 A1 | 11/2011 | Nelsen |
| 2011/0295749 A1 | 12/2011 | Scalisi |
| 2012/0029990 A1 | 2/2012 | Fisher |
| 2012/0066041 A1 | 3/2012 | Mankoff |
| 2012/0066212 A1 | 3/2012 | Jennings |
| 2012/0197716 A1 | 8/2012 | Rampell et al. |
| 2012/0197754 A1 | 8/2012 | Kalin |
| 2013/0254068 A1 | 9/2013 | Scipioni et al. |
| 2014/0058873 A1 | 2/2014 | Sorensen |

FOREIGN PATENT DOCUMENTS

| | | |
|---|---|---|
| JP | 2002/334287 | 11/2002 |
| JP | 2004/265294 | 9/2004 |
| KR | 2002/0070232 | 9/2002 |
| KR | 2002/0094340 | 12/2002 |
| KR | 2004/0076556 | 9/2004 |
| KR | 2000061515 | 6/2006 |
| KR | 2006/0083825 | 7/2006 |
| KR | 2007/0030467 | 3/2007 |
| KR | 2010/0045666 | 5/2010 |
| WO | WO 02/073489 | 9/2002 |
| WO | WO 03/014982 | 2/2003 |
| WO | WO 2006/065037 | 6/2006 |
| WO | WO 2013/033266 | 3/2013 |

OTHER PUBLICATIONS

"Digital Island Corrects and Replaces Previous News Release, BW2059, CA-Digital-Island", Business Wire, Jan. 22, 2001.

"AOL Digital City Kicks Off Major Expansion to Widen Lead in Fast-Growing Local Online Market", Business Wire, Mar. 21, 2000.

"WindWire Launches WindCaster; Wireless Ad Network Delivers Marketing and Advertising Over the New Wireless Web Medium", Business Wire, Jun. 27, 2000.

Launch of WindWire Undisputed Success; Leader in Wireless Advertising Solutions Serves Over One Million Ads With Click-Through Rates of More Than 15 Percent in First Week of Launch:, Business Wire, Oct. 17, 2000.

"Alcatel Introduces Advanced Version of Its Intelligent Location-Based Server", Canadian Corporate News, Mar. 20, 2001.

"Smart AdServer Targets Quova for Geolocation Needs; Adserving Innovator Switches to Quova for Reliability and Depth of Data", CCNMatthews Newswire, Feb. 5, 2008.

Susan Glairon, "New Marketing Scheme Brings Online Ads to Boulder, Colo., Wireless Customers", Knight Rider/Tribune Business News, Aug. 6, 2000.

Sarah Littman, "On the Verge: The Users are Catching Up with the Technology in the U.S. Mobile Marketing Arena. Are You Ready to Capitalize on a New Marketing Medium that is Almost Ready for its Close-Up? (Mobile Technology)", Response, Feb. 1, 2008.

"Personalized Information to Mobile Users—Add2Phone and Setec to Co-Operate in Mobile E-Commerce", M2 Presswire, Apr. 20, 2000.

Sarah McCammon, "Ladies, It's Your Night for a Bargain (Neighbor)", Daily Herald (Arlington Heights, IL), Feb. 5, 2004.

"The Next Wave in Advertising", New Straits Times, Jul. 2, 2000.

Sanjay Parekh, "Personalization: Turn Browsers Into Buyers: Gathering Customer Intelligence is an art and a Science (Customer Relationship Management)", e-Business Advisor, Sep. 1, 2002.

"[x+1] Personalizes Web Optimization with New, Patented Technoogy", PR Newswire, Sep. 18, 2007.

"Power of Real Time (Brief Article)", Crain's New York Business, Oct. 30, 2000.

Michelle Speir, "BlackBerry pushes a Sweet Solution", Nov. 6, 2000, Federal Computer Week, pp. 40-42.

"Consumers Can Show Their Support for Small Business This Holiday Season on "Small Business Saturday(SM)"". Retrieved from http://about.americanexpress.com/news/pr/2010/sbs.aspx Nov. 28, 2011.

"Developments in cyberbanking" By: Adams, Lee S.; Martz, David J.; Poindexter, Obrea O.—The Business Lawyer 56.3, May 2001.

* cited by examiner

202 ⇨

```
┌─────────────────────────────────────────────────────────────┐
│ The social network system notifies the rule-based gift      │
│ giving system of the life event of a user-selected friend   │
│                           204                               │
└─────────────────────────────────────────────────────────────┘
                              ↓
┌─────────────────────────────────────────────────────────────┐
│ The rule-based gift giving system automatically sends the   │
│                      gift to the friend                     │
│                           206                               │
└─────────────────────────────────────────────────────────────┘
                              ↓
┌─────────────────────────────────────────────────────────────┐
│ The rule-based gift giving system completes the transaction │
│              using the user's financial information         │
│                           208                               │
└─────────────────────────────────────────────────────────────┘
                              ↓
┌─────────────────────────────────────────────────────────────┐
│ The rule-based gift giving system notifies the user of      │
│                      the transaction                        │
│                           210                               │
└─────────────────────────────────────────────────────────────┘
```

```
┌─────────────────────────────────────────────────────────────┐
│ The social network system notifies the user of the life     │
│ event of a user-selected friend                             │
│                         222                                 │
└─────────────────────────────────────────────────────────────┘
                              ↓
┌─────────────────────────────────────────────────────────────┐
│ If the user chooses to send a gift, the user accesses the   │
│ rule-based gift giving system and selects a gift            │
│                         224                                 │
└─────────────────────────────────────────────────────────────┘
                              ↓
┌─────────────────────────────────────────────────────────────┐
│ The rule-based gift giving system automatically sends the   │
│ selected gift                                               │
│                         226                                 │
└─────────────────────────────────────────────────────────────┘
                              ↓
┌─────────────────────────────────────────────────────────────┐
│ The rule-based gift giving system completes the transaction │
│ using the user's financial information                      │
│                         228                                 │
└─────────────────────────────────────────────────────────────┘
                              ↓
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
  The rule-based gift giving system notifies the user of the
│ transaction                                                 │
                           230
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

Give | $ Amount | for | Intended usage | when | Friend | Event | until | Rule expiration | Recurring?
| $10.00 | | Drink | | Patrick Ledbetter | Birthday | | June 1, 2012 | Yes Accompanying message>>

Happy birthday! This round is on me.
Cheers,
Adam

Apply the same rule to multiple friends >>      Apply the same rule to multiple events >>

404

Give | $ Amount | for | Intended usage | when | Friend | Event | until | Rule expiration | Recurring?
| $50.00 | | Spa | | Anne Smith | Engaged | | No expiration | No Accompanying message>>

Apply the same rule to multiple friends >>      Apply the same rule to multiple events >>

Click to add another automatic gift>>

You will not be billed until one of the above-listed events occurs and triggers an automatic gift to your friend.
Your payment source is set as: Visa card ending in …9712 click here to view or modify payment settings

*Fig. 4B*

METHOD FOR RULE-BASED GIFT GIVING

PRIORITY INFORMATION

The present application is a continuation of U.S. patent application Ser. No. 14/278,628, filed May 15, 2014, which is a continuation-in-part application claiming priority to U.S. Nonprovisional application Ser. No. 14/193,068, filed Feb. 28, 2014, which is a continuation of Ser. No. 12/075,655, filed Mar. 13, 2008 now U.S. Pat. No. 8,676,704 issued on Mar. 18, 2014, and to U.S. Nonprovisional application Ser. No. 12/475,122, filed May 29, 2009, which claims priority to Provisional Application 61/057,106, filed May 29, 2008, the content of which applications is incorporated by reference in their entirety.

BACKGROUND OF THE INVENTION

Social networks enable users to create lists of friends. First a user creates a profile with a social network, including personal information such as birthday, education status, marital and/or relationship status, current employer, current location, etc. The social network systems often provide news feeds to users about changes in personal information of friends of the user. For example, if a first user has a second user listed as a friend, the first user is notified when the second user gets engaged, changes his/her job, has his/her birthday, etc. An example of news feed feature is provided by Facebook where the life events of friends on a user's profile is provided on the user's home page when the user signs in to his/her Facebook account.

However, the current social networks do not provide means for users to send gifts to their friends. Furthermore, the current social networks do not provide a means for automating the gifting process through gift scheduling or rules-based gifting. Upon being notified of a change in a friend's personal information, the user has to navigate various sources, such as websites, to find, buy and send gifts to the friends. The present invention enables a user to create rules for sending gifts to friends on user-specified life events.

SUMMARY

The present invention enables a user to collect information about life events of one or more friends from one or more social network systems and/or from one or more online accounts, profiles, etc. The list of life events may be stored on the user's profile on one or more of the social network systems. Alternatively, the list of life events may be sent by one or more social network systems to a database or website, such as a rule-based gift giving website.

Once the life events information is collected, the information may be organized in a user-preferred format such as a list, news streams and/or calendar items. The user may generate one or more rules identifying one or more friends to whom to send gifts on selected life events. According to one embodiment, the user may generate a default list of friends who will automatically receive user-selected gifts on user-selected life events. According to another embodiment, the user may generate an on-demand list of friends who will receive gifts on selected life events upon user's approval.

BRIEF DESCRIPTION OF THE DRAWINGS

These and other aspects of this invention will be readily apparent from the detailed description below and the appended drawings, which are meant to illustrate and not to limit the invention, and in which:

FIGS. 2A-2B are flowcharts illustrating an automated rule-based gift giving method;

FIGS. 2A and 2C are flowcharts illustrating a non-automated rule-based gift giving method;

FIG. 4B illustrates a second exemplary rule created using the rule-based gift giving system.

DETAILED DESCRIPTION

Figure 1:
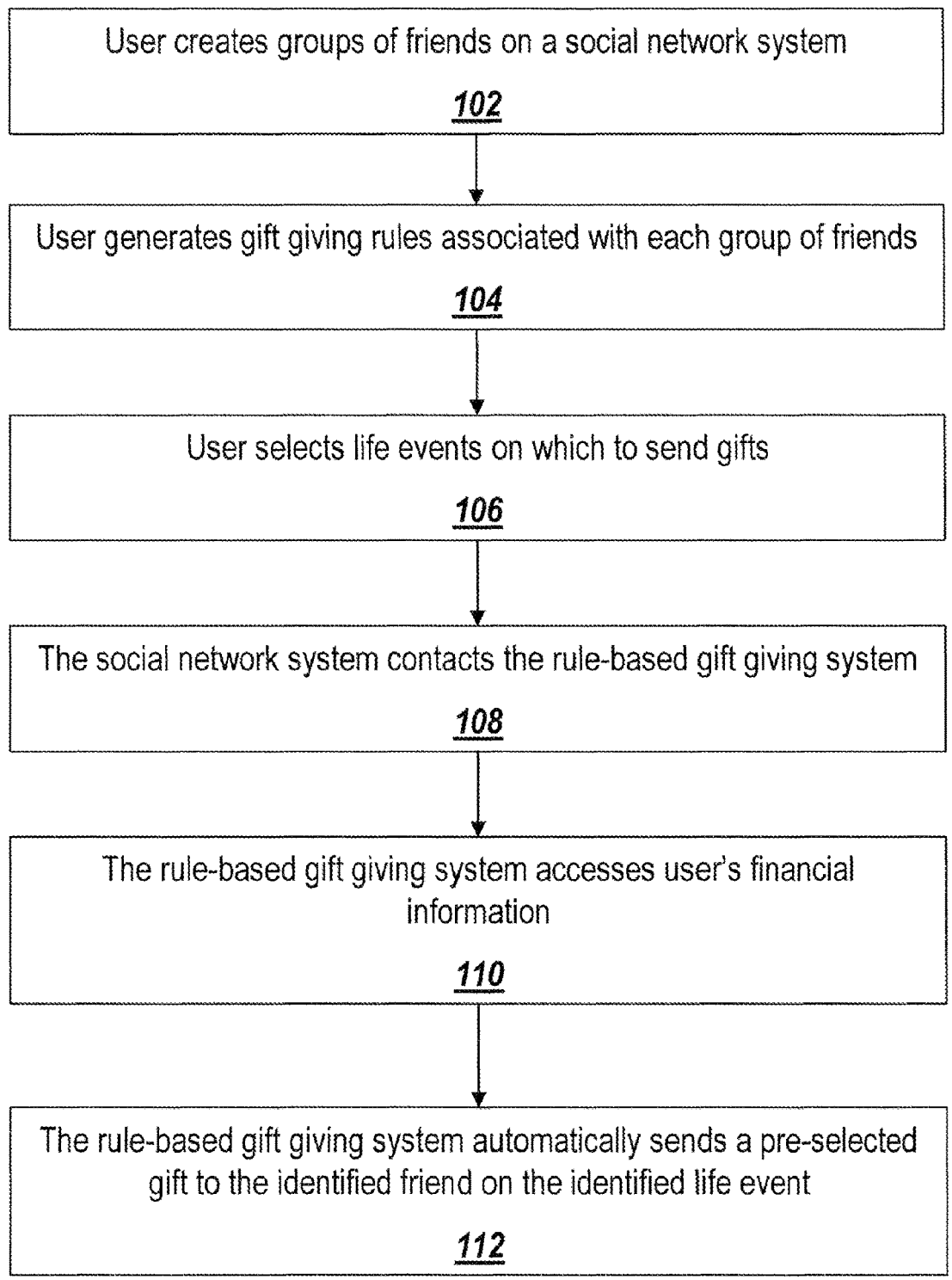
FIG. 1 is a flowchart illustrating generating and using a rule-based gift giving method.

The terms "giftor" or "user" are used throughout the description to indicate the party using the rule-based gifting system to give a gift to another party.

The terms "giftee" or "recipient" are used throughout the description to indicate the party receiving the gift from the giftor or user.

The term "friend" is used throughout the description to indicate a person listed in a social network of another person, without taking into consideration a personal intimacy level.

The invention can be used with different types of gifts, such as living, perishable or inanimate gifts, including but not limited to cash, food, drink, clothing, accessories, household items, flowers, travel arrangements, entertainment tickets, etc.

The present invention enables a giftor to collect information about life events of one or more friends. The life events include, but are not limited to, scheduled events such as birthdays, national and/or religious holidays, graduations, and unscheduled events such as relationship status changes (e.g., engagement or marriage), job changes, moves from one location to another, etc. The life events may be gathered from one or more social network systems, such as MySpace, Facebook, etc. and/or from one or more online accounts, profiles, etc. The list of life events may be stored on the user's profile on one or more of the social network systems. Alternatively, the list of life events may be sent by one or more social network systems to a database or another website, such as a rule-based gift giving website.

Once the life events information is collected, the information may be organized in a user-preferred format such as a list, news streams and/or calendar items. The news stream or the list may also include information about gifts received by the user. The user may generate a sub-list of friends to whom to send gifts on selected life events. According to one embodiment, the user may generate a default list of friends who will automatically receive user-selected gifts on user-selected life events. According to another embodiment, the user may generate an on-demand list of friends who will receive gifts on selected life events upon user's approval. According to various embodiments of the present invention, a gift may be a real-life gift or a virtual gift.

According to various embodiments of the present invention, the user may create a profile with a rule-based gift giving website. The user's financial information may be stored with the rule-based gift giving website. Alternatively, the rule-based gift giving website may access another website or a database where the user's financial information may be stored. The rule-based gift giving website may interact with financial institution websites, such as escrow service websites, bank or credit card websites, various online shopping websites and social networking websites. The social networking websites may provide a hyperlink to the rule-based gift giving website, for example in proximity of the life event information presented to the user. In other words, the user may be prompted with a hyperlink to the rule-based gift giving website when there is a life event notification for a friend on the user's social networking system profile. One of ordinary skill in the art would appreciate that the use of hyperlinks are for illustrative purposes and that the user may be prompted using other means, including but not limited to pop-up messages, emails, short messages sent to wireless devices, etc.

For example, the user may have a first group of friends, a second group of friends and a third group of friends gathered from one or more social networking systems, or online portals. Each group of friends may include one or more friends. The user may create a first rule that automatically sends flowers to the first group of friends on their birthdays. When a birthday of a friend in the first group of friends arrives, the social networking system may prompt the rule-based gift giving system. Alternatively, the rule-based gift giving system may acquire and store the personal information of each friend on the user's lists. The rule-based gift giving system may update this information when the information changes on the one or more social network systems. For example, the rule-based gift giving system may use a flower delivery website to select and send a pre-defined kind of flowers or flowers worth a pre-defined amount of money. The rule-based gift giving system may use the user's financial information stored on the rule-based gift giving website or access and use the user's financial information stored elsewhere.

The user may further create a second rule that informs the user when a friend from the second group of friends gets engaged. Upon receiving the notification, the user may authorize to send a gift to the friend in the second group of friends or may simply ignore the notification. The user may also create a rule to automatically send a gift from a list of user-selected gifts to a friend in the third group of friends on a selected life event, such as Christmas. The first, second and third groups of friends may be, but are not required to, mutually exclusive.

According to various embodiments of the present invention, the user may also send a personal note, such as an electronic greeting card, an email or a short message (SMS) along with the gift. The personal note may be sent directly to giftee' profile on the social networking system, to an email address or a cellular phone registered with the social networking system or the rule-based gift giving system.

FIG. 1 is a flowchart illustrating generating and using a rule-based gift giving method 100. As illustrated in FIG. 1, the user first creates groups of friends on a social network system (step 102). Each group of friends may include one or more friends. The user may also create groups of friends from one or more social network systems, email portals, blog groups, etc. The user then generates gift giving rules associated with each group of friends (step 104). The rules may include setting type of gifts, amount of money to be spent on a gift, specifications of the gift, such as type, color, size, friend-preferred brands, etc. The rules may also include selecting one or more life events on which to send gifts (step 106). The rules may be stored on a rule-based gift giving system, including but not limited to a website or a database. According to an embodiment the gift giving website may be embedded in the social network system. When the life event occurs, the social network system may contact the rule-based gift giving system (step 108). Alternatively, the rule-based gift giving system may contact the social network system to receive updates about a user's friends life events. The rule-based gift giving system may access the user's financial information (step 110). The user's financial information may be stored on the rule-based gift giving system. Alternatively, the user may instruct the rule-based gift giving system to access the user's financial information stored on a financial institution website or a database. The rule-based gift giving system may automatically send a pre-selected gift to the identified friend on the identified life event (step 112).

Figure 2A:
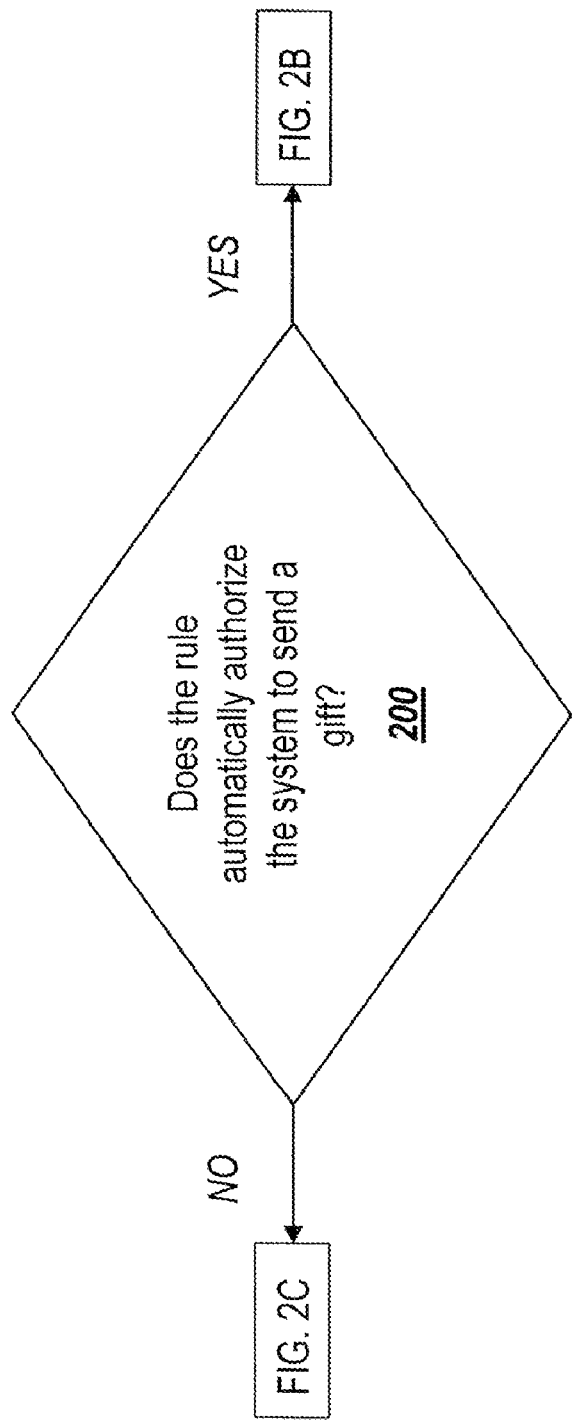

According to various embodiments of the present invention, the rule-based gift giving may automatically send gifts to selected friends on selected life events. Alternatively, the user may request to be prompted with a message for a selected type of life events for one or more friends. The user may then choose to send a gift using the rule-based gift giving, or the user may simply ignore the prompt. FIG. 2A illustrates the first step of a flowchart asking whether the rule created by the user automatically authorizes the system to send a gift (step 200). If the rule is an automated gift giving rule, the flowchart proceeds to the flowchart 202 illustrated in FIG. 2B.

As illustrated in FIG. 2B, according to an automated gift giving rule, the social network system may directly notify the rule-based gift giving system when the user selected life event occurs for a user-selected friend (step 204). The rule-based gift giving system may automatically send the user-selected gift to the giftee (step 206). The rule-based gift giving system may either access a website selling the user-selected gift or may transfer funds as a gift to the friend's financial account to be used toward the user-selected gift. For example, if the user selected sending flowers as a gift, the rule-based gift giving system may access a florist website and select the user-identified flowers. The user may identify a type of flowers, such as roses, or the user may identify an amount that may be spent on the transactions, such as $50, which can be termed a gift credit. The user may further identify which website to use in the rule. Alternatively, the user may direct the rule-based system to use a random website for the selected gift, such as a random florist website on the internet. Similarly, when the user selected sending flowers as a gift, if the giftee has a financial account registered with the rule-based gift giving system, the rule-based gift giving system may transfer user-specified funds (the gift credit) to the giftee' registered financial account to be used for buying flowers. The system may then monitor the transactions of the financial account of the individual or the recipient (the giftee) of the gift credit or the gift. The monitoring is done to determine when the individual makes a qualified purchase using the financial account. When the qualified purchase matches the rule (identifying the gift or the spending category according to the rule), then money (the gift credit) is transferred to the financial account of the individual. In the automatic rule-based gift giving method, the rule-based gift giving system completes the transaction using the user's financial information (step 208). Optionally, the rule-based gift giving system may notify the user when the transaction is complete (step 210).

If the rule is a non-automated gift giving rule, the flowchart proceeds to the flowchart 220 illustrated in FIG. 2C. As illustrated in FIG. 2C, according to a non-automated gift giving rule, the social network system or the rule-based gift giving system may notify the user when the life event occurs for a user-selected friend (step 222). If the user chooses to send a gift, the user may access the rule-based gift giving system and selects a gift by creating a rule (step 224). The social network system may provide a hyperlink to the rule-based gift giving system's website. The hyperlink may be provided in proximity of the notification of the life event. One of ordinary skill in the art would appreciate that the use of hyperlinks are for illustrative purposes and should not be construed as limiting. Pop-up screens, audio/visual alerts, hotspots are among examples of ways to provide access to the rule-based gift giving website. Alternatively, the life event updates may directly appear on the rule-based gift giving system's website. The rule-based gift giving system may automatically send the user-selected gift to the giftee (step 226). As indicated above, the rule-based gift giving system may either access a website selling the user-selected gift or may transfer funds as a gift to the friend's financial account to be used toward the user-selected gift. The rule-based gift giving system may complete the transaction using the user's financial information (step 228). Since the user elects to send the gift in the non-automated rule-based system, it is not necessary to notify the user when the transaction is complete. However, according to various embodiments of the present invention, the rule-based gift giving system may still notify the user of the transaction for improved user profile security purposes (step 230).

According to various embodiments of the present invention, the user may be prompted with an option to send a gift to a friend on friend's life events. If the user wishes to send a gift, the user may proceed to the gift giving website and send the gift without creating a rule. For example, on a birthday of a friend, the user may be prompted with a question whether the user wishes to send a gift to the friend. The user may choose to send the gift and proceed with the steps provided by the gift giving system without creating a rule.

Figure 3:
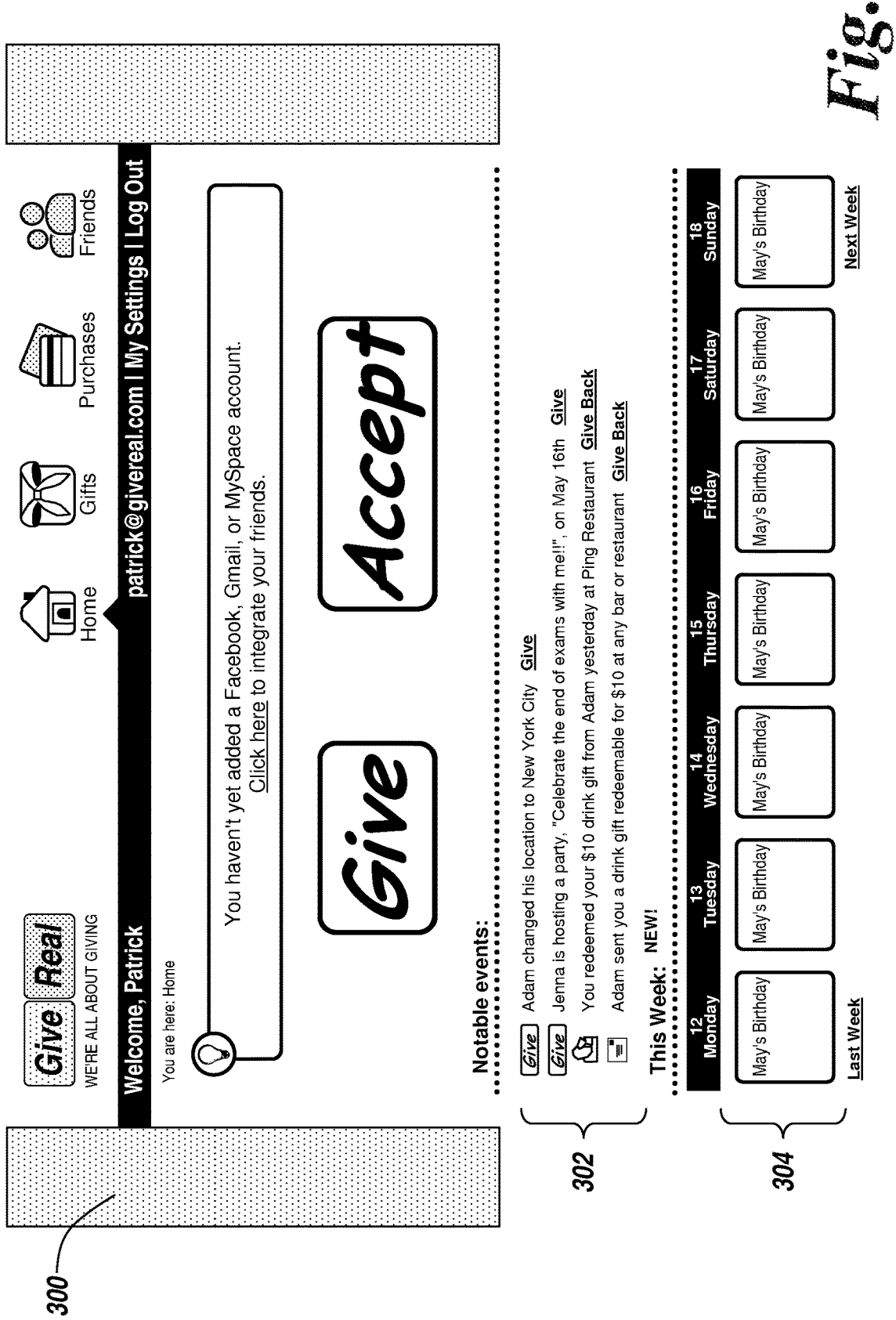
FIG. 3 illustrates an exemplary user interface for the rule-based gift giving website.

FIG. 3 illustrates an exemplary user interface 300 of the rule-based gift giving website. As illustrated in FIG. 3, the rule-based gift giving website may include a news feed 302 comprising life event changes of a user's friends. The news feed 302 may also display information about the gifts received by the user. The news feed 302 may provide the option to send a gift, for example in form of a hyperlink, next to each life event update. According to various embodiments of the present invention, the rule-based gift giving website may also display the life event updates in form of a calendar 304. The calendar view 304 may be customized to be displayed in daily, weekly or monthly formats. One of ordinary skill in the art would appreciate that the news feed view 302 and the calendar view 304 are exemplary forms to illustrate life event updates and that alternative forms such as email messages, short messages (SMS) sent to wireless devices, pop-up reminder messages may be used for similar purpose.

Figure 4A:
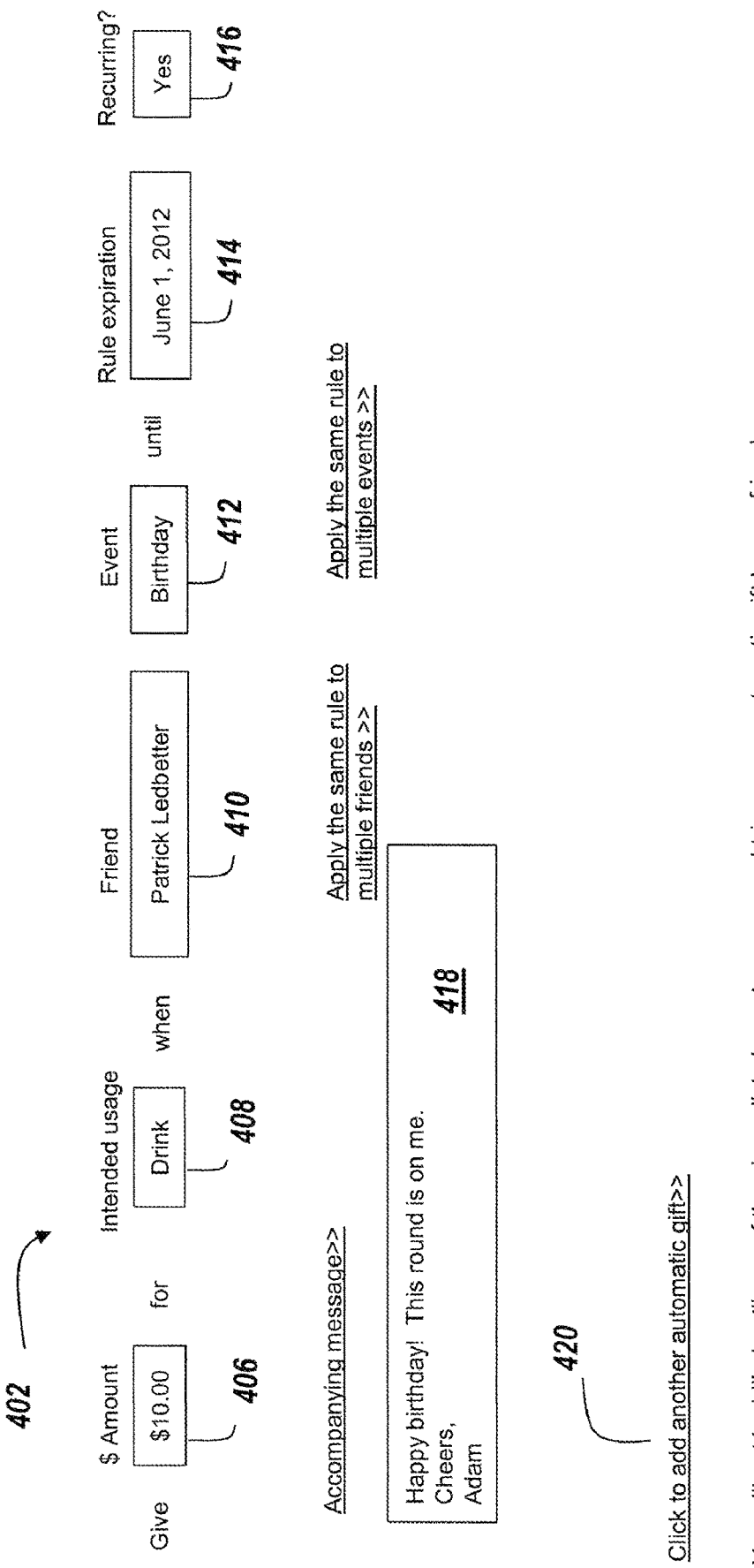
FIG. 4A illustrates a first exemplary rule created using the rule-based gift giving system.

FIG. 4A illustrates a first exemplary rule 402 created by a user using the rule-based gift giving system. According to the first exemplary rule 402, the user indicates the amount of money 406 to be spent on the gift. The user further indicates the intended use of the gift 408. The intended use 408 may also identify the type, color, size, brand, quantity of the gift. The rule may also include an indication of the recipient 410. The recipient 410 may be a single person as illustrated in FIG. 4A. Alternatively, the recipient may be a group of friends. The rule may further include the type of life event 412 on which the rule-based gift giving system will be sending the gift to the identified recipient 410. According to various embodiments of the present invention, the rule may include an expiration date 414 and the option of being a recurring gift 416. According to the first exemplary rule 402 illustrated in FIG. 4A, the recipient will receive a $10 worth of drinks every year on his birthdays until Jun. 1, 2012. The rule-based gift giving system may also provide the user with an option of sending a personal message 418 to the recipient. The user may identify himself/herself on the message or may choose to stay anonymous. The rule-based gift giving system may allow the user to add additional rules by selecting the option 420.

FIG. 4B illustrates a second exemplary rule 404 created using the rule-based gift giving system. According to the second exemplary rule 404 illustrated in FIG. 4B, the recipient will receive a $50 worth of a spa visit as her engagement present. The gift is a one time gift only and there is no expiration date for this gift.

While the invention has been shown and described with reference to specific preferred embodiments, it should be understood by those skilled in the art that various changes in form and detail may be made therein without departing from the spirit and scope of the invention.

We claim:

1. A method comprising:
    gathering, via a processor and via a social networking system in which users accept friend requests and exchange messages or posts with accepted friends, information about life events of each individual in a list of a plurality of individuals;
    presenting on a graphical user interface of the social networking system a life event of an individual from the list of the plurality of individuals;
    receiving, at a first time and via the processor and the social networking system, a rule from a giver specifying the individual in the list and the life event;
    receiving, via the processor and via the social networking system, an identification of a gift credit for a gift from the giver to the individual;
    transmitting an electronic notice to a mobile device associated with the individual, the electronic notice identifying the gift credit from the giver;
    monitoring purchases of the individual after the first time and according to the rule for a qualifying purchase of the gift, the purchases being made using a financial account of the individual; and
    based on the monitoring and when the individual makes the qualifying purchase of the gift according to the rule, transferring funds, via the processor and at a second time which is later than the first time, from a giver account of the giver to the financial account of the individual to be used as the gift credit toward the qualifying purchase of the gift, wherein the giver account and the financial account of the individual in the list are both registered with a rule-based gift giving system, and wherein the financial account of the individual is a general purpose financial account.

2. The method of claim 1, wherein the life event comprises one of a birthday, a change of marital status, a change of employer, a change of location, a religious holiday, a national holiday and a graduation.

3. The method of claim 1, wherein the rule further comprises a monetary value of the gift as the gift credit.

4. The method of claim 1, wherein the rule further comprises one or more attributes of the one or more gifts, the one or more attributes comprising color, dimension, brand, type, size or quantity.

5. A computer-readable storage device storing instructions which, when executed by a processor, cause the processor to perform operations comprising:

gathering, via a social networking system in which users accept friend requests and exchange messages or posts with accepted friends, information about life events of each individual in a list of a plurality of individuals;

presenting on a graphical user interface of the social networking system a life event of an individual from the list of the plurality of individuals;

receiving, at a first time and via the social networking system, a rule from a giver specifying the individual in the list and the life event;

receiving, via the social networking system, an identification of a gift credit for a gift from the giver to the individual;

transmitting an electronic notice to a mobile device associated with the individual, the electronic notice identifying the gift credit from the giver;

monitoring purchases of the individual after the first time and according to the rule for a qualifying purchase of the gift, the purchases being made using a financial account of the individual; and based on the monitoring and when the individual makes the qualifying purchase of the gift according to the rule, transferring funds, at a second time which is later than the first time, from a giver account of the giver to the financial account of the individual in the list to be used as the gift credit toward the qualifying purchase of the gift, wherein the giver account and the financial account of the individual are both registered with a rule-based gift giving system, and wherein the financial account of the individual is a general purpose financial account.

6. The computer-readable storage device of claim 5, wherein the life event comprises one of a birthday, a change of marital status, a change of employer, a change of location, a religious holiday, a national holiday and a graduation.

7. The computer-readable storage device of claim 5, wherein the rule further comprises a monetary value of the gift as the gift credit.

8. The computer-readable storage device of claim 5, wherein the rule further comprises one or more attributes of the one or more gifts, the one or more attributes comprising color, dimension, brand, type, size or quantity.

9. A system comprising:
a processor; and
a computer-readable storage medium storing instructions which, when executed by a processor, cause the processor to perform operations comprising:

gathering, via a social networking system in which users accept friend requests and exchange messages or posts with accepted friends, information about life events of each individual in a list of a plurality of individuals;

presenting on a graphical user interface of the social networking system a life event of an individual from the list of the plurality of individuals;

receiving, at a first time and via the social networking system, a rule from a giver specifying the individual in the list and the life event associated with the individual;

receiving, via the social networking system, an identification of a gift credit for a gift from the giver to the individual;

transmitting an electronic notice to a mobile device associated with the individual, the electronic notice identifying the gift credit from the giver;

monitoring purchases of the individual after the first time and according to the rule for a qualifying purchase of the gift, the purchases being made using a financial account of the individual; and based on the monitoring and when the individual makes the qualifying purchase of the gift according to the rule, transferring funds, at a second time which is later than the first time, from a giver account of the giver to the financial account of the individual in the list to be used as the gift credit toward the qualifying purchase of the gift, wherein the giver account and the financial account of the individual are both registered with a rule-based gift giving system, and wherein the financial account of the individual is a general purpose financial account.

10. The system of claim 9, wherein the life event comprises one of a birthday, a change of marital status, a change of employer, a change of location, a religious holiday, a national holiday and a graduation.

11. The system of claim 9, wherein the rule further comprises a monetary value of the gift as the gift credit.

12. The system of claim 9, wherein the rule further comprises one or more attributes of the one or more gifts, the one or more attributes comprising color, dimension, brand, type, size or quantity.

* * * * *